(12) United States Patent
Ohyu

(10) Patent No.: US 9,483,824 B2
(45) Date of Patent: Nov. 1, 2016

(54) IMAGE ANALYSIS DEVICE AND CONTROL METHOD OF AN IMAGE ANALYSIS DEVICE

(71) Applicant: Toshiba Medical Systems Corporation, Otawara-shi (JP)

(72) Inventor: Shigeharu Ohyu, Otawara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/556,465

(22) Filed: Dec. 1, 2014

(65) Prior Publication Data
US 2015/0161788 A1 Jun. 11, 2015

(30) Foreign Application Priority Data
Dec. 6, 2013 (JP) .................................. 2013-253164

(51) Int. Cl.
G06K 9/00 (2006.01)
G06T 7/00 (2006.01)
(52) U.S. Cl.
CPC ... *G06T 7/0016* (2013.01); *G06T 2207/10076* (2013.01); *G06T 2207/10096* (2013.01); *G06T 2207/30104* (2013.01)
(58) Field of Classification Search
None
See application file for complete search history.

(56) References Cited

U.S. PATENT DOCUMENTS

| | | | |
|---|---|---|---|
| 6,389,304 B1 * | 5/2002 | Van Den Brink | G01R 33/56341 324/306 |
| 7,467,006 B2 * | 12/2008 | Abe | G01R 33/5601 324/307 |
| 2001/0033162 A1 * | 10/2001 | Harvey | G01R 33/561 324/307 |
| 2007/0126730 A1 * | 6/2007 | Goto | A61B 5/02007 345/418 |
| 2008/0294035 A1 * | 11/2008 | Zwick | A61B 5/0515 600/420 |
| 2010/0253342 A1 * | 10/2010 | Kimura | A61B 5/0275 324/309 |

FOREIGN PATENT DOCUMENTS

IT WO2009019722 * 2/2009

OTHER PUBLICATIONS

Paul S. Tofts et al. "Quantitative Analysis of Dynamic Gd-DTPA Enhancement in Breast Tumors Using a Permeability Model", MRM, vol. 33, 1995, 5 pages.

* cited by examiner

*Primary Examiner* — Nancy Bitar
(74) *Attorney, Agent, or Firm* — Oblon, McClelland, Maier & Neustadt, L.L.P

(57) ABSTRACT

In one embodiment, an image analysis device (65) includes an acquisition unit (66) and an analysis unit (67). The acquisition unit acquires image data of a plurality of images of an imaging region of an object respectively imaged by magnetic resonance imaging before and after administration of contrast medium. The analysis unit calculates an estimated value of concentration of contrast medium per unit volume including air region by using a coefficient based on the image data before administration of contrast medium, in accordance with the image data of a plurality of images and a value related to relaxation rate or relaxation time before and after administration of contrast medium.

18 Claims, 5 Drawing Sheets

IMAGE ANALYSIS DEVICE AND CONTROL METHOD OF AN IMAGE ANALYSIS DEVICE

CROSS-REFERENCE TO RELATED APPLICATION

This application is based upon and claims the benefit of priority from Japanese Patent Application No. 2013-253164 filed on Dec. 6, 2013;

The entire contents of which are incorporated herein by reference.

BACKGROUND OF THE INVENTION

1. Field of the Invention

Embodiments described herein relate generally to an image analysis device, and a control method of an image analysis device.

2. Description of the Related Art

MRI is an imaging method which magnetically excites nuclear spin of an object (a patient) placed in a static magnetic field with an RF pulse having the Larmor frequency and reconstructs an image on the basis of MR signals generated due to the excitation. The aforementioned MRI means magnetic resonance imaging, the RF pulse means a radio frequency pulse, and the MR signal means a nuclear magnetic resonance signal.

In MRI, a perfusion analysis software for analyzing blood flow volume is known. For example, if image data of a plurality of images obtained by dynamic imaging with administration of contrast medium or the like are inputted, local blood flow volume is calculated by the perfusion analysis software on the basis of the respective pixel values of the plurality of images. The above dynamic imaging is an imaging method in which time-series images are obtained from the same cross-section over a plurality of time phases.

Each pixel value of MRI approximately corresponds to intensity of an MR signal detected in each pixel position, and is not linearly related to concentration of contrast medium in tissue, in general. Note that, in this specification, it is assumed that "tissue" indicates regions of an object other than air and includes blood and blood vessels unless otherwise noted. Thus, in order to accurately measure blood flow volume in MRI, it is desirable to convert pixel values into values in proportional to concentration of contrast medium.

As a conventional technology related to this, the following Non-Patent Document 1 is known.

[Non-Patent Document 1] Paul S. Tofts et al., Quantitative Analysis of Dynamic Gd-DTPA Enhancement in Breast Tumors Using a Permeability Model; MRM, vol. 33, pp 564-568 (1995)

In a tissue including a lot of air such as a lung, a tissue and air are mixed in one pixel, MR signals are generated from a tissue region, and intensity of the detected MR signal becomes a value reflecting intensity of the MR signal in the tissue region.

Here, $R_1$ value indicative of relaxation rate of contrast medium is an inverse number of longitudinal relaxation time. Thus, an $R_1$ value of each pixel in MRI is not an average value of the corresponding pixel but a value reflecting the $R_1$ value of the tissue region in the corresponding pixel.

Then, in MRI, the concentration of contrast medium of each pixel calculated on the basis of the gap between an $R_1$ value before administration of contrast medium and an $R_1$ value at each clock time after administration of contrast medium is not contrast medium amount per predetermined volume including air but close to a value of contrast medium amount per predetermined volume including only tissue regions excluding an air region.

Local blood flow volume (inflowing blood amount per predetermined volume and per unit time) calculated on the basis of $R_1$ values in this manner is not a value per predetermined volume including air but close to a value per predetermined volume excluding air in the pixel.

On the other hand, because blood flow volume measured by other methods or devices such as an X-ray computed tomography apparatus is a value per predetermined volume including air, local blood flow volume measured by MRI becomes a greatly different value from local blood flow volume measured by other methods.

In order to provide an intelligible explanation with a concrete example, consider a pixel A consisting of 50% tissue and 50% air and a pixel B consisting of 100% tissue. In the case of an X-ray computed tomography apparatus, for example, a pixel value given by HU (Hounsfield Unit) value increases in proportion to rise of concentration of contrast medium in each pixel. It is assumed that the pixel value of the pixel A is 50 before administration of contrast medium, the pixel value of the pixel B is 100 before administration of contrast medium, and concentration of contrast medium in all the tissue regions uniformly increased by 10% at time C after administration of contrast medium.

In this case, for example, the pixel value of the pixel A becomes 55 at time C, the pixel value of the pixel B becomes 110 at time C, the pixel A indicates 5 of contrast medium inflow per predetermined volume and per predetermined time, and the pixel B indicates 10 of contrast medium inflow per predetermined volume and per predetermined time. That is, the blood flow volume (corresponding to increment of concentration of contrast medium per predetermined volume and per predetermined time) measured by an X-ray computed tomography apparatus is a value per predetermined volume including air, and the blood flow volume of the pixel B is measured as a double value of the blood flow volume of the pixel A.

On the other hand, because concentration of contrast medium in accordance with the gap between an $R_1$ value before administration of contrast medium and an $R_1$ value at each clock time after administration of contrast medium is calculated in MRI, an air region of the pixel A has no influence on the measurement. Thus, both the pixel A and pixel B are commonly calculated that 10 of contrast medium are flowed in per predetermined volume and per predetermined time at time C after administration of contrast medium. In order to avoid confusion, it is preferable that local blood flow volume calculated in MRI becomes a value similar to local blood flow volume measured by other methods.

Therefore, a novel technology to calculate a value close to local blood flow volume per predetermined volume including air in an object by correcting non-linearity between a signal value and concentration of contrast medium in the case of calculating local blood flow volume in MRI has been desired.

DETAILED DESCRIPTION

Hereinafter, examples of aspects which embodiments of the present invention can take will be explained per aspect.

(1) According to one embodiment, an image analysis device includes an acquisition unit and an analysis unit.

The acquisition unit acquires image data of a plurality of images of an imaging region of an object (patient) respectively imaged under magnetic resonance imaging before and after administration of contrast medium.

The analysis unit calculates an estimated value of concentration of contrast medium per unit volume including air region by using a coefficient based on the image data before administration of contrast medium, in accordance with the image data of a plurality of images and a value related to relaxation rate or relaxation time before and after administration of contrast medium.

(2) According to another embodiment, a control method of an image analysis device includes the following steps.

One of the steps is to control an image analysis device so as to acquire image data of a plurality of images of an imaging region of an object respectively imaged under magnetic resonance imaging before and after administration of contrast medium.

The other of the steps is to control the image analysis device so as to calculate an estimated value of concentration of contrast medium per unit volume including an air region by using a coefficient based on the image data before administration of contrast medium, in accordance with the image data of a plurality of images and a value related to relaxation rate or relaxation time before and after administration of contrast medium.

An image analysis device and a control method of an image analysis device according to embodiments of the present invention will be described with reference to the accompanying drawings.

As an example in the following embodiment, an MRI apparatus in which the image analysis device capable of solving the aforementioned problem is installed will be explained. Note that the same reference numbers are given for identical components in each figure, and overlapping explanation is abbreviated.

Configuration of the Present Embodiment

Figure 1:
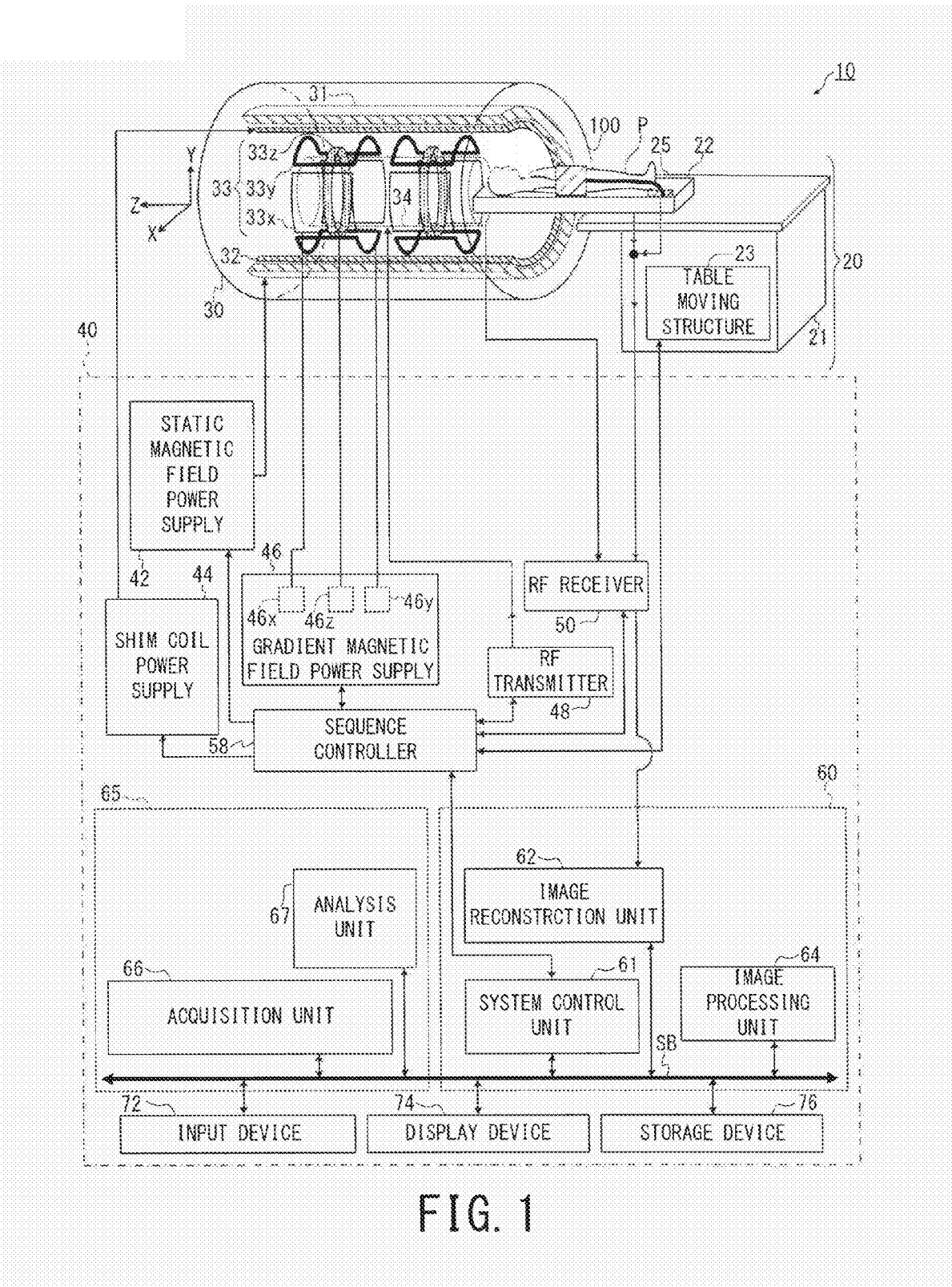
FIG. 1 is a block diagram showing the overall structure of the MRI apparatus according to the present embodiment.

FIG. 1 is a block diagram showing the overall structure of the MRI apparatus 10 according to the present embodiment. As an example here, the components of the MRI apparatus 10 will be explained by classifying them into three groups which are a bed device 20, a gantry 30 and a control device 40.

Firstly, the bed device 20 includes a supporting platform 21, a table 22, and a table moving structure 23 disposed inside the supporting platform 21. An object P is loaded on the top surface of the table 22. In addition, a plurality of connection ports 25 are disposed on the top surface of the table 22, and a chest part RF coil device 100 loaded on the object P is connected to one of these connection ports 25.

The supporting platform 21 supports the table 22 in such a manner that the table 22 can move in the horizontal direction (i.e. the Z axis direction of the apparatus coordinate system).

The table moving structure 23 adjusts the position of the table 22 in the vertical direction by adjusting the height of the supporting platform 21, when the table 22 is located outside the gantry 30.

In addition, the table moving structure 23 inserts the table 22 into inside of the gantry 30 by moving the table 22 in the horizontal direction and moves the table 22 to outside of the gantry 30 after completion of imaging.

Secondly, the gantry 30 is shaped in the form of a cylinder, for example, and is installed in an imaging room. The gantry 30 includes a static magnetic field magnet 31, a shim coil unit 32, a gradient magnetic field coil unit 33 and an RF coil unit 34.

The static magnetic field magnet 31 is, for example, a superconductivity coil and shaped in the form of a cylinder. The static magnetic field magnet 31 forms a static magnetic field in an imaging space by using electric currents supplied from the later-described static magnetic field power supply 42.

The aforementioned "imaging space" means, for example, a space in the gantry 30 in which the object P is placed and to which the static magnetic field is applied.

Note that the static magnetic field magnet 31 may include a permanent magnet which makes the static magnetic field power supply 42 unnecessary.

The shim coil unit 32 is, for example, shaped in the form of a cylinder and arranged inside the static magnetic field magnet 31 so as to become coaxial with the static magnetic field magnet 31. The shim coil unit 32 forms an offset magnetic field that uniforms the static magnetic field by using electric currents supplied from the later-described shim coil power supply 44 of the control device 40.

The gradient magnetic field coil unit 33 is, for example, shaped in the form of a cylinder and arranged inside the shim coil unit 32. The gradient magnetic field coil unit 33 includes an X axis gradient magnetic field coil $33x$, a Y axis gradient magnetic field coil $33y$ and a Z axis gradient magnetic field coil $33z$.

In this specification, the X axis, the Y axis and the Z axis are assumed to be those of the apparatus coordinate system unless otherwise specifically noted. As an example here, the apparatus coordinate system, whose X axis, Y axis and Z axis are perpendicular to each other, is defined as follows.

Firstly, the Y axis direction is defined as the vertical direction, and the table 22 is disposed in such a position that the direction of the normal line of its top surface accords with the Y axis direction. The horizontal moving direction of the table 22 is defined as the Z axis direction, and the gantry 30 is installed in such a manner that its axis direction accords with the Z axis direction. The X axis direction is the direction perpendicular to these Y axis direction and Z axis direction, and is the width direction of the table 22 in the example of FIG. 1.

The X axis gradient magnetic field coil $33x$ forms a gradient magnetic field Gx in the X axis direction in an imaging region in accordance with an electric current supplied from the later-described X axis gradient magnetic field power supply $46x$.

Similarly, the Y axis gradient magnetic field coil 33y forms a gradient magnetic field Gy in the Y axis direction in the imaging region in accordance with an electric current supplied from the later-described Y axis gradient magnetic field power supply 46y.

Similarly, the Z axis gradient magnetic field coil 33z forms a gradient magnetic field Gz in the Z axis direction in the imaging region in accordance with an electric current supplied from the later-described Z axis gradient magnetic field power supply 46z.

Thereby, directions of a gradient magnetic field Gss in a slice selection direction, a gradient magnetic field Gpe in a phase encoding direction and a gradient magnetic field Gro in a readout (frequency encoding) direction can be arbitrarily selected as logical axes, by combining the gradient magnetic fields Gx, Gy and Gz in the X axis, the Y axis and the Z axis directions as three physical axes of the apparatus coordinate system.

The above "imaging region" means, for example, at least a part of an acquisition range of MR signals used to generate one image or one set of images, which becomes an image. The imaging region is defined as a part of the imaging space in terms of range and position by the apparatus coordinate system, for example.

For example, when MR signals are acquired in a range wider than a region made into an image in order to prevent aliasing (artifact), the imaging region is a part of the acquisition range of MR signals.

On the other hand, in some cases, the entire acquisition range of MR signals becomes an image, i.e. the imaging region and the acquisition range of MR signals agree with each other. In addition, the above one set of images means, for example, a plurality of images when MR signals of the plurality of images are acquired in a lump in one pulse sequence such as multi-slice imaging.

The RF coil unit 34 is, for example, shaped in the form of a cylinder and arranged inside the gradient magnetic field coil unit 33. The RF coil unit 34 includes a non-illustrated whole body coil that combines a function of transmitting RF pulses and a function of detecting MR signals.

Thirdly, the control device 40 includes the static magnetic field power supply 42, the shim *coli* power supply 44, a gradient magnetic field power supply 46, an RF transmitter 48, an RF receiver 50, a sequence controller 58, a first CPU (Central Processing Unit) 60, a second CPU 65, an input device 72, a display device 74 and a storage device 76.

The gradient magnetic field power supply 46 includes the X axis gradient magnetic field power supply 46x, the Y axis gradient magnetic field power supply 46y and the Z axis gradient magnetic field power supply 46z.

The X axis gradient magnetic field power supply 46x, the Y axis gradient magnetic field power supply 46y and the Z axis gradient magnetic field power supply 46z supply the respective electric currents for forming the gradient magnetic field Gx, the gradient magnetic field Gy and the gradient magnetic field Gz to the X axis gradient magnetic field coil 33x, the Y axis gradient magnetic field coil 33y and the Z axis gradient magnetic field coil 33z, respectively.

The RF transmitter 48 generates RF pulse electric currents of the Larmor frequency for causing nuclear magnetic resonance in accordance with control information inputted from the sequence controller 58, and outputs the generated RF pulse electric currents to the RF coil unit 34. The RF pulses in accordance with these RF pulse electric currents are transmitted from the RF coil unit 34 to the object P.

The RF transmitter 48 generates RF pulse electric currents of the Larmor frequency for causing nuclear magnetic resonance in accordance with control information inputted from the sequence controller 58, and outputs the generated RF pulse electric currents to the RF coil unit 34. The RF pulses in accordance with these RF pulse electric currents are transmitted from the RF coil unit 34 to the object P.

The whole body coil of the RF coil unit 34 and the RF coil device 100 loaded on the object P detect MR signals generated due to excited nuclear spin inside the object P by the RF pulses and the detected MR signals are inputted to the RF receiver 50.

The RF receiver 50 generates raw data which are digitized complex number data of MR signals obtained by performing predetermined signal processing on the received MR signals and then performing A/D (analogue to digital) conversion on them.

The RF receiver 50 inputs the generated raw data of MR signals to the later-described image reconstruction unit 62 of the first CPU 60.

The sequence controller 58 stores control information needed in order to make the gradient magnetic field power supply 46, the RF transmitter 48 and the RF receiver 50 drive in accordance with commands from the first CPU 60.

The aforementioned control information includes, for example, sequence information describing operation control information such as intensity, application period and application timing of the pulse electric currents which should be applied to the gradient magnetic field power supply 46.

The sequence controller 58 generates the gradient magnetic fields Gx, Gy and Gz and RF pulses by driving the gradient magnetic field power supply 46, the RF transmitter and the RF receiver 50 in accordance with a predetermined sequence stored.

The first CPU 60 functions as a control system of the MRI apparatus 10. The first CPU 60 includes a system control unit (system control function) 61, a system bus SB, an image reconstruction unit (image reconstruction function) 62, and an image processing unit (image processing function) 64.

The system control unit 61 performs system control of the MRI apparatus 10 in setting of imaging conditions of a main scan, an imaging operation and image display after imaging through interconnection such as the system bus SB.

The aforementioned term "imaging condition" refers to under what condition RF pulses or the like are transmitted in what type of pulse sequence, or under what condition MR signals are acquired from the object P, for example.

As parameters of the imaging conditions, for example, there are an imaging region as positional information in the imaging space, flip angle α, repetition time TR, the number of slices, an imaging part and the type of the pulse sequence such as spin echo and parallel imaging. The above "imaging part" means a region of the object P to be imaged, such as a head, a chest, and an abdomen.

The aforementioned "main scan" is a scan for imaging an intended diagnosis image such as a proton density weighted image, and it does not include a scan for acquiring MR signals for a scout image or a calibration scan. A scan is an operation of acquiring MR signals, and it does not include image reconstruction processing.

The calibration scan is a scan for determining unconfirmed elements of imaging conditions, conditions and data used for image reconstruction processing and correction processing after the image reconstruction, and the calibration is performed separately from the main scan. A prescan is one of the calibration scans to be performed before the main scan.

In addition, the system control unit 61 makes the display device 74 display screen information for setting imaging conditions, sets the imaging conditions on the basis of command information from the input device 72, and inputs the determined imaging conditions to the sequence controller 58. In addition, the system control unit 61 makes the display device 74 display images indicated by the generated display image data after completion of imaging.

The input device 72 provides a user with a function to set the imaging conditions and image processing conditions.

The image reconstruction unit 62 arranges and stores the raw data of MR signals inputted from the RF receiver 50 as k-space data, in accordance with the phase encode step number and the frequency encode step number. The above k-space means a frequency space.

The image reconstruction unit 62 generates image data of the object P by performing image reconstruction processing including such as two-dimensional or three-dimensional Fourier transformation and so on. The image reconstruction unit 62 inputs the generated image data to the image processing unit 64 and stores the generated image data in the storage device 76.

Note that image data of MRI are data in which each pixel has a pixel value, for example. A pixel value indicates, for example, the luminance level of the pixel when the pixel is displayed, and it reflects intensity of MR signals detected from the object region corresponding to the pixel. In a case of a slice, horizontal and vertical pixel size of image data of MRI becomes, for example, the phase encode step number by the frequency encode step number.

The image processing unit 64 performs predetermined image processing on the image data after the image reconstruction, and stores the image data after the image processing in the storage device 76 as display image data.

The storage device 76 stores the display image data after adding accompanying information such as the imaging conditions used for generating the display image data and information of the object P (patient information) to the display image data.

The second CPU 65 functions as an image analysis device and generates perfusion maps or the like by analyzing concentration of contrast medium. A perfusion map is, for example, a map image generated in such a manner that a pixel of a position with higher blood flow rate in an imaging slice has a larger pixel value and it is color-coded with various chromatic colors depending on the pixel value of each pixel.

The second CPU 65 includes the system bus SB shared with the first CPU 60, an acquisition unit (acquisition function) 66, and an analysis unit (analysis function) 67.

The acquisition unit 66 acquires and stores imaging conditions and so on necessary for generating the perfusion map.

The analysis unit 67 calculates time change of the concentration of contrast medium, and generates the perfusion map.

Note that the five units including the first CPU 60, the second CPU 65, the input device 72, the display device and the storage device 76 may be constituted as one computer and disposed in a computer room, for example.

In addition, though the components of the MRI apparatus 10 are classified into three groups (the gantry 30, the bed device 20 and the control device 40) in the above explanation, this is only an example of interpretation. For example, the table moving structure 23 may be interpreted as a part of the control device 40.

Alternatively, the RF receiver 50 may be included not outside the gantry 30 but inside the gantry 30. In this case, for example, an electronic circuit board that is equivalent to the RF receiver 50 may be disposed in the gantry 30. Then, the MR signals, which are analog electrical signals converted from the electromagnetic waves by the RF coil device and so on, may be amplified by a pre-amplifier in the electronic circuit board, then the amplified signals may be outputted to the outside of the gantry 30 as digital signals and inputted to the image reconstruction unit 62. In outputting the signals to the outside of the gantry 30, for example, an optical communication cable is preferably used to transmit the signals in the form of optical digital signals. This is because the effect of external noise is reduced.

Principle of the Present Embodiment

Next, the method of calculating concentration of contrast medium in the present embodiment will be explained. As an example here, it is assumed that a plurality of time-series images are sequentially obtained from the same imaging region by dynamic imaging of an FE (Field Echo) method and contrast medium is administered to the object P at time t=0 (hereinafter, noted as time t0). In addition, it is assumed that (t) means a function of time t indicative of elapsed time in the parameters used in the following explanation.

As an example here, it is assumed that a pixel value of any pixel is equal to the intensity of the MR signal detected from this pixel position, and a pixel value in one arbitrary pixel at time t is defined as SI(t). Because contrast medium does not instantaneously permeate every blood vessel inside the object, the pixel value SI(0) at time t0 when contrast medium is administered is equal to the pixel value before administration of contrast medium (equal to the pixel value temporally prior to time t0).

Thus, as an example in this specification, "before administration of contrast medium" is used to mean before an effect of contrast medium is seen in terms of MRI measurement. For example, if an effect of contrast medium is not seen in measurement, the clock time at which 1 femtosecond has elapsed from the instance of start of administration of contrast medium is included "before administration of contrast medium".

In addition, the repetition time in a pulse sequence is defined as TR [second], and the flip angle of an excitation RF pulse is defined as α [°]. The Letter in square brackets means the unit of the parameter. In addition, longitudinal relaxation time is defined as $T_1(t)$ and the longitudinal relaxation time at time t0 is defined as $T_{10}$.

Because correction of non-uniformity of magnetic field is not performed in the FE method, the transverse relaxation time reflecting the non-uniformity of magnetic field is defined as $T_2^*$. Then, a pixel value in the FE method is obtained by the next equation.

$$SI(t) = \left\{ M_0 \cdot \sin\alpha \cdot \exp\left(\frac{-TE}{T_2^*}\right) \right\} \times \frac{1 - \exp\left(-\frac{TR}{T_1(t)}\right)}{1 - \cos\alpha \cdot \exp\left(-\frac{TR}{T_1(t)}\right)} \quad (1)$$

In the above equation (1), though it depends on conditions, $M_0$ is a value corresponding to magnetic moment of spin of hydrogen atoms, for example. In addition, TE is echo time. The constant part of the equation (1) is defined as m, by the next equation.

$$m = M_0 \cdot \sin\alpha \cdot \exp\left(\frac{-TE}{T_2^*}\right) \quad (2)$$

During time-series imaging, m is constant and m is considered to be proportional to density of tissue (i.e. ratio of non-air regions). Actually, the transverse relaxation time $T_2^*$ changes depending on concentration of contrast medium, however, variation of SI(t) corresponding to an MR signal value in relation to variation of transverse relaxation time $T_2^*$ can be lessened by using a small value for the echo time TE and the repetition time TR. Thereby, m can be regarded as constant after injecting contrast medium.

In addition, the $R_1$ value before administration of contrast medium is defined as $R_{10}$, and the $R_1$ value after administration of contrast medium is noted as $R_1(t)$ as a function of elapsed time t. The $R_1$ value indicates relaxation rate of contrast medium, and is an inverse value of the longitudinal relaxation time.

That is, $R_{10}=1/T_{10}$, and $R_1(t)=1/T_1(t)$. Variation between the relaxation rate before administration of contrast medium and the relaxation rate at each clock time after administration of contrast medium is defined as $\Delta R_1(t)$. Variation of relaxation rate $\Delta R_1(t)$ is obtained by the next equation.

$$\Delta R_1(t) = R_1(t) - R_{10} = \{1/T_1(t)\} - \{1/T_{10}\} \quad (3)$$

Next, a part of the right-hand side of the equation (1) at clock time t=0 is defined as B by the following equation (4), a part of B is defined as $E_1$ by the following equation (5), and the estimated value C(t) of concentration of contrast medium is defined by the following equation (6) with the use of these B and $E_1$.

$$B = \frac{1 - \exp\left(-\frac{TR}{T_{10}}\right)}{1 - \cos\alpha \cdot \exp\left(-\frac{TR}{T_{10}}\right)} \quad (4)$$

$$E_1 = \exp\left(-\frac{TR}{T_1(t)}\right) \quad (5)$$

$$C(t) = \frac{T_{10} \cdot B \cdot \ln\left(\frac{1}{E_1}\right)}{TR \cdot (1 - E_1)/(1 - E_1 \cdot \cos\alpha)} \times SI(t) - SI(0) \quad (6)$$

By defining the concentration of contrast medium C(t) in the above manner, the estimated value C(t) of the concentration of contrast medium can be calculated without directly determining $R_1(t)$ or $T_1(t)$ if $E_1$ is determined. It is assumed that the estimated value C(t) of concentration of contrast medium indicates the concentration of contrast medium itself as an example here, and it is hereinafter simply described as "concentration of contrast medium C(t)".

However, because it is actually enough to know time variation of increase or decrease of concentration of contrast medium before and after the administration of contrast medium, C(t) may be calculated as a value in proportion to the concentration of contrast medium. Here, the relation of the next equation holds according to the equation (1).

$$\frac{SI(t)}{SI(0)} = \frac{1 - \exp\left(-\frac{TR}{T_1(t)}\right)}{1 - \cos\alpha \cdot \exp\left(-\frac{TR}{T_1(t)}\right)} \bigg/ \frac{1 - \exp\left(-\frac{TR}{T_{10}}\right)}{1 - \cos\alpha \cdot \exp\left(-\frac{TR}{T_{10}}\right)} \quad (7)$$

$$= \frac{1}{B} \times \frac{1 - \exp\left(-\frac{TR}{T_1(t)}\right)}{1 - \cos\alpha \cdot \exp\left(-\frac{TR}{T_1(t)}\right)}$$

$$= \frac{1}{B} \times \frac{1 - E_1}{1 - \cos\alpha \cdot E_1}$$

Here, by converting the above equation (7) several times, $E_1$ is defined by the equation (8) as the final part below.

$$(1 - E_1 \cdot \cos\alpha) \times \frac{SI(t)}{SI(0)} = \frac{1 - E_1}{B} \quad (8)$$

$$\frac{SI(t)}{SI(0)} - E_1 \cdot \cos\alpha \times \frac{SI(t)}{SI(0)} = \frac{1}{B} - \frac{E_1}{B}$$

$$\frac{E_1}{B} - E_1 \cdot \cos\alpha \times \frac{SI(t)}{SI(0)} = \frac{1}{B_1} - \frac{SI(t)}{SI(0)}$$

$$E_1 = \left(\frac{1}{B_1} - \frac{SI(t)}{SI(0)}\right) \bigg/ \left(\frac{1}{B} - E_1 \cdot \cos\alpha \times \frac{SI(t)}{SI(0)}\right)$$

$$E_1 = \left(1 - B \times \frac{SI(t)}{SI(0)}\right) \bigg/ \left(1 - B \cdot \cos\alpha \times \frac{SI(t)}{SI(0)}\right)$$

In the equation (8), B is determined by using the repetition time TR, the flip angle $\alpha$ and the longitudinal relaxation time $T_{10}$ (or $R_{10}$) before administration of contrast medium. Then, by substituting $E_1$ determined by the equation (8) into the equation (6), the concentration of contrast medium C(t) can be calculated without determining $R_1(t)$ or $T_1(t)$ by using SI(t) and SI(0) given by pixel values, for example.

Next, the reason why C(t) defined by the equation (6) is substantially equal to concentration of contrast medium per predetermined volume will be explained by converting equations as follows.

Because SI(0) is a value obtained by substituting $T_{10}$ into $T_1(t)$ in the right side of the equation (1), SI(0) is expressed by the next equation by substituting m of the equation (2) and B of the equation (4) into the equation (1).

$$SI(0) = m \times B \quad (9)$$

By converting the above equation (9), the next equation holds.

$$m = SI(0)/B \quad (10)$$

In addition, by substituting m of the equation (2) and $E_1$ of the equation (5) into the right side of equation (1), SI(t) is expressed by the next equation.

$$SI(t) = m \times \frac{1 - E_1}{1 - \cos\alpha \cdot E_1} \quad (11)$$

By substituting the equation (10) into the above equation (11), SI(t) is expressed by the next equation.

$$SI(t) = \frac{SI(0)}{B} \times \frac{1 - E_1}{1 - \cos\alpha \cdot E_1} \quad (12)$$

In addition, by converting the equation (5) that defines $E_1$, the next equation holds.

$$\frac{\ln(E_1)}{TR} = -\frac{1}{T_1(t)} \quad (13)$$

Next, the equation (6) is converted like the following equation (14). That is, SI(t) is eliminated by substituting the equation (12) into the equation (6), then SI(0) is eliminated by substituting the equation (9), then the equation (13) is substituted.

$$C(t) = \frac{T_{10} \cdot B \cdot \ln\left(\frac{1}{E_1}\right)}{TR \cdot (1-E_1)/(1-\cos\alpha \cdot E_1)} \times SI(t) - SI(0) \qquad (14)$$

$$= \frac{T_{10} \cdot \ln\left(\frac{1}{E_1}\right)}{TR} \times SI(0) - SI(0)$$

$$= T_{10} \cdot B \cdot \left(\frac{SI(0)}{TR \cdot B} \times \ln\left(\frac{1}{E_1}\right) - \frac{SI(0)}{T_{10} \cdot B}\right)$$

$$= T_{10} \cdot B \cdot \left(-\frac{m}{TR}\ln(E_1) - \frac{m}{T_{10}}\right)$$

$$= m \cdot T_{10} \cdot B \cdot \left(\frac{1}{T_1} - \frac{1}{T_{10}}\right)$$

$$= m \cdot T_{10} \cdot B \cdot (R_1(t) - R_{10})$$

$$= m \cdot T_{10} \cdot B \cdot \Delta R_1$$

Because the part of $T_{10} \times B$ in the above equation is a constant value before and after administration of contrast medium, C(t) is in proportion to the product of $\Delta R_1$ and m, and m is in proportion to tissue density.

Here, firstly, the larger the ratio of air in one pixel is, the smaller the ratio of the tissue region (i.e. m) becomes.

Secondly, the value of $\Delta R_1$ in MRI is a variation of concentration of contrast medium per predetermined volume of a tissue region excluding air.

Because "m which becomes smaller as the ratio of air region in the pixel is larger" is multiplied to this $\Delta R_1$, C(t) as the result of the product of these two parameters is converted to the concentration of contrast medium per predetermined volume including air.

In addition, because the concentration of contrast medium C(t) is calculated so as to be in proportion to $\Delta R_1$ as shown by the equation (14), the concentration of contrast medium C(t) is calculated under the state in which non-linearity between the intensity of MR signals (the pixel value SI(t) in this example) and the concentration of contrast medium C(t) is corrected.

Here, the equation (6) defining the concentration of contrast medium C(t) is converted from another viewpoint in order to consider physical meaning of the equation (6).

First, the relationship of the following equation (15) holed according to the above equation (7).

$$B = \frac{SI(0)}{SI(t)} \times \frac{1-E_1}{1-\cos\alpha \cdot E_1} \qquad (15)$$

In addition, the following equation (16) holds by converting the equation (13).

$$\frac{\ln\left(\frac{1}{E_1}\right)}{TR} = \frac{1}{T_1(t)} \qquad (16)$$

Next, the following equation (17) is obtained by substituting the equation (16) into the part multiplied to SI(t) in the right side of the equation (6) defining the concentration of contrast medium C(t) and further substituting the equation (15).

$$\frac{T_{10} \cdot B \cdot \ln(1/E_1)}{TR \cdot (1-E_1)/(1-\cos\alpha \cdot E_1)} = \frac{T_{10} \cdot B}{T_1(t) \cdot (1-E_1)/(1-\cos\alpha \cdot E_1)} \qquad (17)$$

$$= \frac{T_{10}}{T_1(t)} \times \frac{B}{(1-E_1)/(1-\cos\alpha \cdot E_1)}$$

$$= \frac{T_{10}}{T_1(t)} \times \frac{SI(0)}{SI(t)}$$

$$= \frac{R_1(t)}{R_{10}} \times \frac{SI(0)}{SI(t)}$$

The following equation (18) holds by substituting the equation (17) into the equation (6).

$$C(t) = \frac{T_{10} \cdot B \cdot \ln\left(\frac{1}{E_1}\right)}{TR \cdot (1-E_1)/(1-\cos\alpha \cdot E_1)} \times SI(t) - SI(0) \qquad (18)$$

$$= \frac{R_1(t)}{R_{10}} \times \frac{SI(0)}{SI(t)} \times SI(t) - SI(0)$$

$$= \frac{R_1(t)}{R_{10}} \times SI(0) - SI(0)$$

$$= R_1(t) \cdot SI(0) \times \left(\frac{1}{R_{10}} - \frac{1}{R_1(t)}\right)$$

$$= \frac{SI(0) \times (T_{10} - T_1(t))}{T_1(t)}$$

If the $R_1$ value have been already calculated by a conventional method, the concentration of contrast medium C(t) may be calculated on the basis of the equation (18).

Thus, to calculate the concentration of contrast medium C(t) on the basis of the equation (6) is equivalent to calculating the concentration of contrast medium C(t) on the basis of the equation (18).

That is, to calculate the concentration of contrast medium C(t) by using the equation (6) means obtaining a value in proportion to volume concentration of contrast medium by calculating the product ($R_1(t) \times SI(0)$) of the intensity of MR signal before injection of contrast medium and the $R_1$ value after injection of contrast medium.

Here, as to methods of obtaining a product, the present embodiment is not limited to performing multiplication processing.

For example, the following table data may be preliminarily stored in the analysis unit 67 before start of imaging, and the concentration of contrast medium C(t) may be calculated on the basis of the table data.

The table data output a value corresponding to a product (i.e. $R_1(t) \times SI(0)$) by receiving the $R_1$ value after injection of contrast medium and the intensity of MR signal before injection of contrast medium (a pixel value of image data before injection of contrast medium: SI(0)) as two input parameters.

Figure 2:
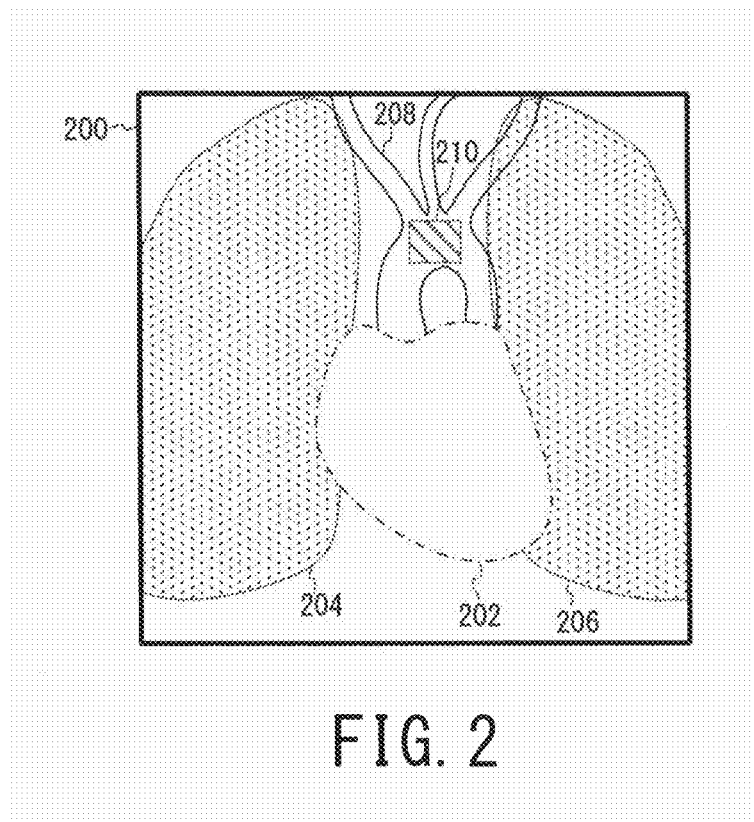
FIG. 2 is a schematic diagram showing an example of an artery region set on a chest part image obtained in a main scan.

FIG. 2 is a schematic diagram showing an example of an artery region set on a chest part image obtained in the main scan. As shown in FIG. 2, the heart 202, a right lung 204, a left lung 206 and an aorta 208 are depicted in the chest part image 200, for example. As an example here, a case of setting a part of the aorta 208 as the artery region 210 will be explained. That is, the artery region is set in such a manner that any region other than artery is not included in the artery region 210.

Figure 3:
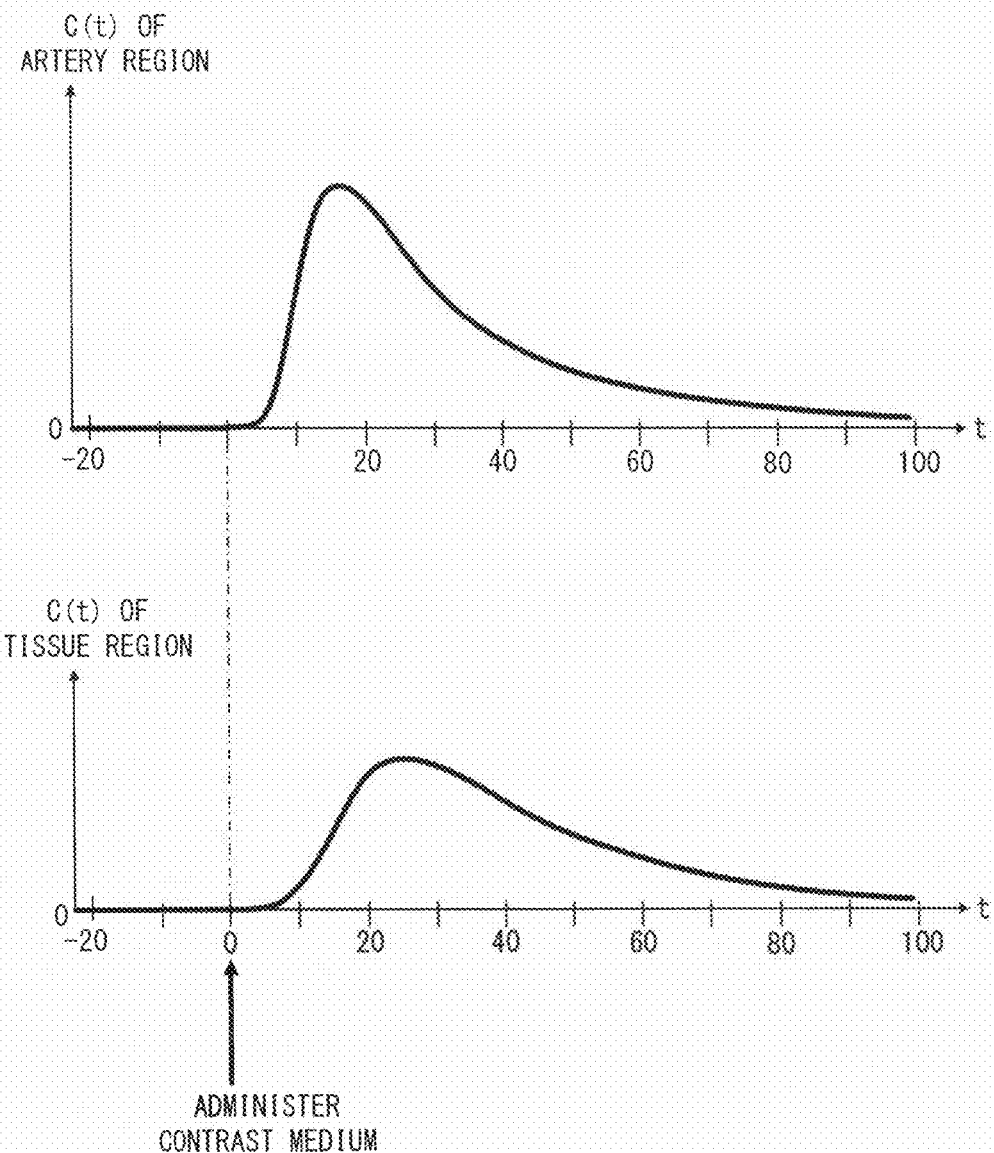
FIG. 3 is a schematic diagram showing an example of time change of contrast medium concentration C(t) in each of the artery region and the tissue region.

FIG. 3 is a schematic diagram showing an example of time change of contrast medium concentration C(t) in each of the artery region and the tissue region. The upper part of FIG. 3 is an example of the time variation of the concentration of contrast medium C(t) in an artery region calculated by using the equation (6), and the lower part of FIG. 3 is an example of the time variation of the concentration of contrast medium C(t) in a tissue region calculated by using the equation (6). In the upper part and the lower part of FIG. 3, each horizontal axis indicates clock time t as elapsed time and each vertical axis indicates the concentration of contrast medium C(t).

Because contrast medium is administered at time t0 as previously mentioned, the concentration of contrast medium is zero and constant before time t0 in both of the artery region and the tissue region. Although the concentration of contrast medium C(t) increases and reaches a peak in the artery region and the tissue region respectively after administration of contrast medium, after this, the concentration of contrast medium C(t) decreases and approaches zero.

Figure 4:
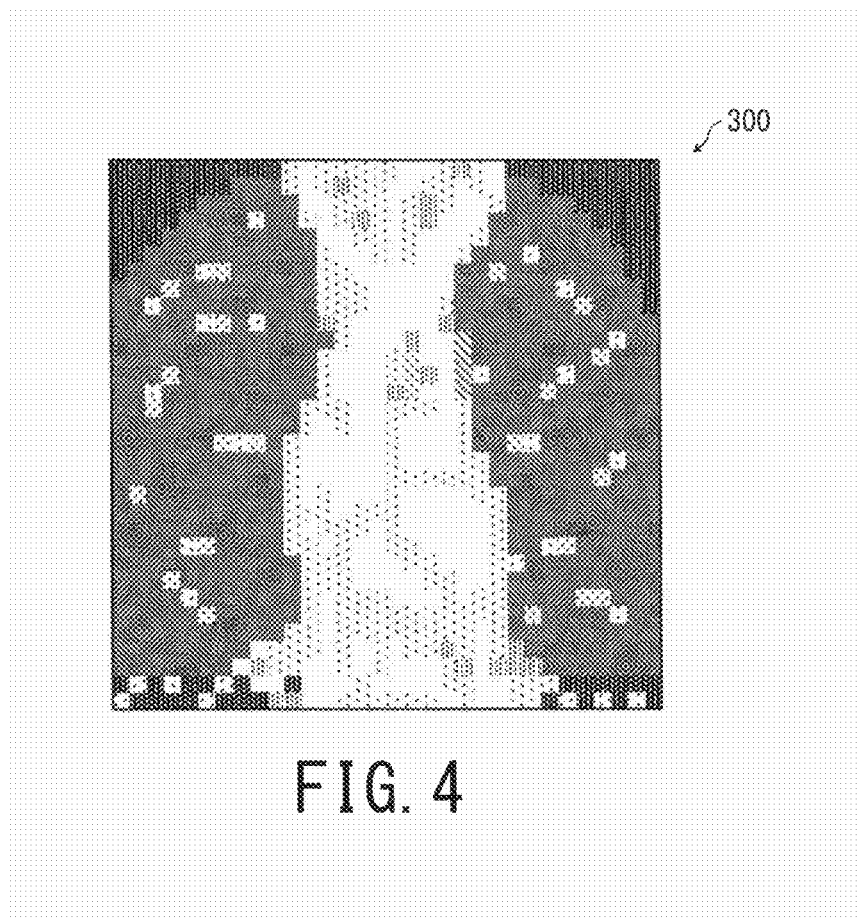
FIG. 4 is a schematic diagram showing an example of a perfusion map obtained by the contrast medium concentration calculated under the method of the present embodiment.

FIG. 4 is a schematic diagram showing an example of a perfusion map obtained by the contrast medium concentration calculated under the method of the present embodiment. Although FIG. 4 is a grayscale map in which a pixel with larger blood flow volume is more whitely indicated, this is only an example. For example, the perfusion map may be displayed with chromatic colors so as to allot red, yellow, green, blue and purple in descending order of blood flow volume. Because FIG. 4 is a perfusion map obtained from the same imaging region as FIG. 2 under dynamic imaging, the artery region in the chest part image 200 of FIG. 2 is whitely depicted and this indicates large blood flow volume.

Operation of the Present Embodiment

Figure 5:
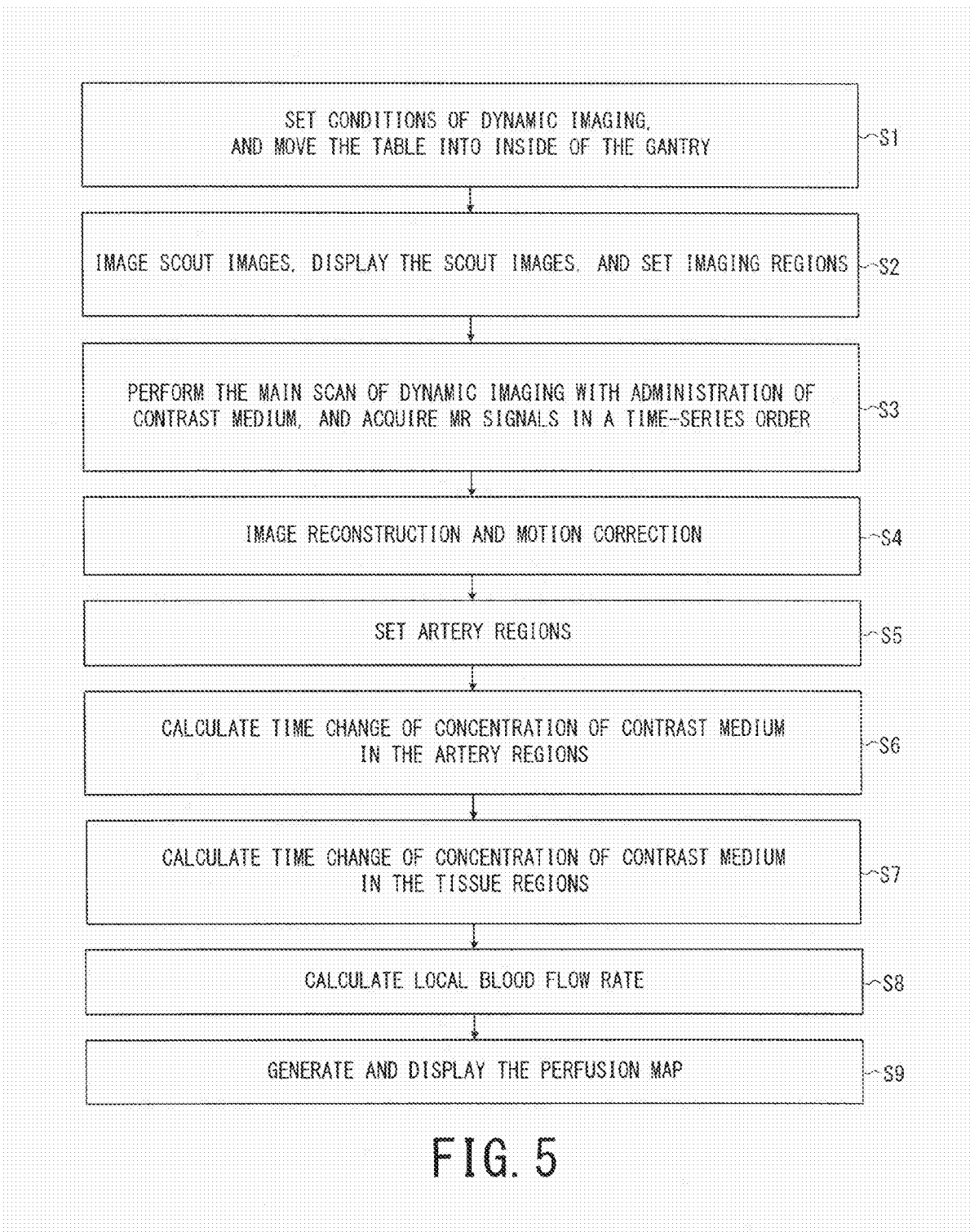
FIG. 5 is a flowchart illustrating an example of a flow of process performed by the MRI apparatus of the present embodiment.

FIG. 5 is a flowchart illustrating an example of a flow of process performed by the MRI apparatus 10 of the present embodiment. As an example here, a case where dynamic imaging of the FE method for the chest part involving administration of contrast medium is performed as the main scan will be explained.

In the following, according to the step numbers in the flowchart shown in FIG. 5, an operation of the MRI apparatus 10 will be described by referring to the aforementioned FIGS. 1 to 4 as required.

[Step S1] The system control unit 61 (see FIG. 1) inputs setting screen information of the imaging conditions of the main scan of dynamic imaging for the chest part and image processing conditions into the display device 74. Thereby, the setting screen for the imaging conditions and image processing conditions is displayed on the display device 74.

The system control unit 61 sets some of the imaging conditions (for example, the repetition time TR, the flip angle α and so on) of the main scan on the basis of the imaging conditions inputted to the input device 72. The system control unit 61 inputs the selected imaging conditions into the acquisition unit 66 of the second CPU and the acquisition unit 66 stores the inputted conditions.

In addition, as image processing conditions, a value of relaxation rate $R_{10}$ before administration of contrast medium is inputted to the input device 72, the acquisition unit 66 acquires and stores the value of $R_{10}$. Incidentally, as to the value of $R_{10}$, this embodiment is not limited to an aspect of being inputted (selected) by an operator. As an alternative structure, for example, a prescan of measuring the longitudinal relaxation time $T_{10}$ may be performed on the imaging region before execution of the main scan so as to input the inverse number of $T_{10}$ as $R_{10}$ to the acquisition unit 66.

Then, the RF coil device 100 for the chest part and a non-illustrated contrast medium injection device are loaded on the object P on the table 22, and the table moving structure 23 horizontally moves the table 22 into inside of the gantry 30 in accordance with control of the system control unit 61 in such a manner that the chest part as the imaging part is positioned at the magnetic field center.

After this, the process proceeds to Step S2.

[Step S2] Scout images are imaged under a conventional procedure. More specifically, a static magnetic field is formed in the imaging space by the static magnetic field magnet 31 excited by the static magnetic field power supply 42. In addition, electric currents are supplied from the shim coil power supply 44 to the shim coil 32, thereby the static magnetic field formed in the imaging space is uniformed.

After this, when the system control unit 61 receives a command of start of imaging from the input device 72, the system control unit 61 inputs imaging conditions including a pulse sequence into the sequence controller 58. Then, the sequence controller 58 drives the gradient magnetic field power supply 46, the RF transmitter 48 and the RF receiver 50 in accordance with the inputted pulse sequence, thereby a gradient magnetic field is formed in the imaging region, where the object P is loaded, and RF pulses are generated from the RF coil unit 34.

Then, MR signals generated by nuclear magnetic resonance inside the object P are detected by the RF coil device 100, and the detected MR signals are transmitted from the RF coil device 100 to the RF receiver 50.

The RF receiver 50 performs the aforementioned predetermined signal processing on the inputted MR signals so as to generate the raw data of MR signals, and inputs these raw data into the image reconstruction unit 62.

The image reconstruction unit 62 arranges and stores the raw data of MR signals as k-space data.

The image reconstruction unit 62 reconstructs image data in a real space by performing image reconstruction processing including Fourier transformation on the k-space data, inputs the reconstructed image data to the image processing unit 64, and stores the reconstructed image data in the storage device 76.

The image processing unit 64 generates two-dimensional display image data by performing predetermined image processing on the reconstructed image data.

The image processing unit 64 inputs these display image data to the display device 74 and the system control unit 61 makes the display device 74 display images indicated by the display image data as the scout images.

After display of the scout images, the imaging region of the chest part is selected by a user on the scout image via the input device 72.

After this, the process proceeds to Step S3.

[Step S3] As an example here, images of the first time phase are imaged from time t=−2 before administration of contrast medium, then contrast medium is administered to the object P at time t0 which is in the vacant time between the first time phase and the second time phase, and then images of the second time phase and the succeeding time phases are imaged, for example. Administration of the contrast medium is remotely and automatically performed by the aforementioned non-illustrated contrast medium injection device in accordance with control of the system control unit 61.

Note that, each time phase is for acquiring MR signals of a plurality of images such as thirty slices or forty slices, for example.

Although dynamic imaging may start from time t0, the above method is more preferable in terms of (a) accurately obtaining data before administration of contrast medium and (b) accurately performing motion correction by obtaining a plurality of images before administration of contrast medium. This is because the number of images before administration of contrast medium is only one at time t0 if dynamic imaging starts from time t0.

Thus, from time t=−2 to the finishing time, MR signals are repeatedly acquired from the imaging region (the same cross-section) selected in Step S2 by the main scan of dynamic imaging of the FE method. Operation of acquiring MR signals is similar to that of scout images. As just described, the MR signals of the images of the respective timings are converted into k-space data and stored in the image reconstruction unit 62.

After this, the process proceeds to Step S4.

[Step S4] The image reconstruction unit 62 performs image reconstruction processing on the k-space data of the main scan acquired in Step S3, inputs the obtained image data of the main scan (in a real space) to the image processing unit 64, and stores the obtained image data in the storage device 76.

The image processing unit 64 generates image data after motion correction by performing processing such as known motion correction processing on the reconstructed image data of the main scan, and stores the image data after motion correction in the storage device 76.

In the motion correction processing, deformation of the right lung 204 and the left lung 206 (see FIG. 2) due to respiration, deformation of the heart due to pulsating or the like are corrected.

Note that, though each pixel value of the image data just after reconstructed by the image reconstruction unit 62 may be used as SI(t) in the calculation of concentration of contrast medium C(t) in the after-mentioned Step S6 and Step S7, each pixel value of the image data subjected to processing such as filter processing may be used as SI(t). As an example here, a case of using each pixel value of the image data subjected to the above motion correction as SI(t) will be explained in the following.

After this, the process proceeds to Step S5.

[Step S5] The system control unit 61 makes the display device 74 display image data of representative timings, for example, at t=0 out of all the image data after motion correction, as images. An operator judges location of the artery region by watching the displayed images, and selects the artery region as ROI (Region Of Interest) via the input device 72.

Note that, as an alternative configuration as to the artery region, it may be automatically selected by the acquisition unit 66. In this case, the acquisition unit 66 extracts characteristic regions such as each organ and bone in the image excluding blood vessels by performing a template matching between the image data and a standard human model including shape and size of each organ and each bone, for example, and then extracts the artery region on the basis of the position of each organ and each bone.

After this, the process proceeds to Step S6.

[Step S6] The acquisition unit 66 obtains image data of all the images of the main scan subject to motion correction from the storage device 76, and stores them.

Next, the analysis unit 67 calculates time variation of the concentration of contrast medium C(t) of the artery region from the start of the main scan to the finishing time of the main scan, on the basis of the equation (6).

More specifically, $E_1$ is calculated by the equation (8) on the basis of a value of (a) $T_{10}$ before administration of contrast medium and (b) pixel values (corresponding to MR signal level) SI(0) and SI(t) before and after administration of contrast medium.

Next, the first term of the right side of the equation (6) is calculated on the basis of the calculated $E_1$. This first term of the right side of the equation (6) becomes a value proportional to the concentration of contrast medium if the pixel value (corresponding to MR signal level) SI(0) is subtracted from it, and has a characteristic of becoming smaller as the rate of air region in the object is larger.

After this, C(t) is calculated as the subtraction between the value of the first term of the right side of the equation (6) and the pixel value (corresponding to MR signal level) SI(0) before administration of contrast medium, and the calculated C(t) is proportional to actual concentration of contrast medium.

In general, one time variation of the concentration of contrast medium C(t) of the artery region is calculated in a unified manner, regardless of whether the pixel selected as the artery region is single or plural.

As a concrete example, consider a case where one hundred images are imaged for the same cross-section from time t=−2 to time t=97 at equal time intervals and fifty pixels being common to these one hundred images in terms of position are selected as the artery region.

In this case, the respective pixel values of the fifty pixels of the artery region are averaged, and this averaging processing is performed for the one hundred images (i.e. one hundred clock times). Then, by gathering the calculated average pixel value of each image as SI(t), the concentration of contrast medium C(t) of the artery region from time t=−2 to time t=97 is calculated. Alternatively, concentration of contrast medium C(t) may be calculated totally fifty times for the fifty pixels, and the average of the calculated fifty patterns of C(t) may be determined as the concentration of contrast medium C(t) of the artery region.

The analysis unit 67 makes the display device 74 display the curve line of the concentration of contrast medium C(t) of the artery region as a graph (see the upper part of FIG. 3). The analysis unit 67 calculates curvilinear characteristic parameters of the time variation curve of the concentration of contrast medium C(t) of the artery region such as the peak height, the maximum tilt and the primary moment, and makes the display device 74 display the calculated parameter values.

After this, the process proceeds to Step S7.

[Step S7] The analysis unit 67 respectively calculates the time variation of the concentration of contrast medium C(t) of all the pixels of the tissue region from the start of the main scan to the end of the main scan. As the tissue region, blood vessel regions may be included or omitted. As an example here, a case of treating all the pixels as the tissue region will be explained. For example, when the number of pixels in height and width is 256 times 256, the concentration of contrast medium C(t) of the tissue region is individually calculated for each pixel of all the 256×256 pixels.

The analysis unit 67 calculates curvilinear characteristic parameters such as the peak height, the time integral value (square measure), the maximum tilt and the primary moment for each of the 256×256 time variation curves of the concentration of contrast medium C(t).

The analysis unit 67 generates, for example, a map of the tissue region consisting of 256×256 pixels as to the peak height, and makes the display device 74 display the generated map. This map is a map in which a pixel with higher peak in the time variation curve of concentration of contrast medium C(t) is more brightly displayed and a pixel with lower peak is more darkly displayed.

Similarly, the analysis unit 67 generates the maps of the tissue region as to other curvilinear characteristic parameters such as the time integral value (square measure) and the maximum tilt, and makes the display device 74 display the generated maps.

After this, the process proceeds to Step S8.

[Step S8] The analysis unit 67 respectively calculates local blood flow volume of every pixel by a known method, on the basis of (a) the time variation curves of concentration of contrast medium C(t) obtained for the respective pixels and (b) the time variation curve of concentration of contrast medium C(t) of the artery region (calculated in a unified manner).

More specifically, deconvolution is performed on the time variation curve of concentration of contrast medium C(t) of a pixel Q as the tissue region by using the time variation curve of concentration of contrast medium C(t) of the artery region. The maximum value of the function obtained by this deconvolution is calculated as the local blood flow volume of this pixel Q. This processing is performed on every pixel.

After this, the process proceeds to Step S9.

[Step S9] The analysis unit 67 generates a perfusion map by using the local blood flow volume of every pixel obtained in Step S8, and makes the display device 74 display the perfusion map (see FIG. 4). In addition, the analysis unit 67 may calculate related parameters such as MTT (Mean Transit Time), distribution volume and Krans (volume transportation constant), generate maps as to these parameters in the way similar to Step S7, and make the display device 74 display the generated maps.

The foregoing is a description of an operation of the MRI apparatus 10 according to the present embodiment.

Effects of the Present Embodiment

As just described, in the present embodiment, because concentration of contrast medium C(t) is calculated so as to become in proportion to the product of $\Delta R_1$ and the coefficient m which becomes smaller with larger rate of air region in the pixel, the concentration of contrast medium C(t) calculated in this manner is converted into concentration of contrast medium per predetermined volume including air. This is obvious from the equation (6) indicative of the concentration of contrast medium C(t).

In addition, because concentration of contrast medium C(t) is calculated so as to become in proportion to the product of $\Delta R_1$, concentration of contrast medium C(t) is calculated under the state in which non-linearity between concentration of contrast medium C(t) and intensity of MR signals (pixel value SI(t)) is corrected. Thus, in MRI, local blood flow volume of a region including air such as a lung can be accurately calculated.

Moreover, concentration of contrast medium C(t) is calculated on the basis of $T_{10}$, pixel values of image data and the imaging conditions such as the repetition time TR and the flip angle $\alpha$, by determining $E_1$ with the use of the equation (8) and substituting this into the equation (6). That is, concentration of contrast medium C(t) per predetermined volume including air can be calculated without directly determining $R_1(t)$.

According to the aforementioned embodiment, in the case of calculating local blood flow volume in MRI, a value close to local blood flow volume per predetermined volume including air can be calculated with correction of non-linearity between a signal value and concentration of contrast medium.

Supplementary Notes on Embodiments

[1] In the aforementioned embodiment, the image analysis processing after completion of reconstruction of the image data of the main scan to generation and display of the perfusion map (Step S5 to Step S9) may be programmed by coding so as to make an image analysis program.

Thus, the second CPU 65 of the aforementioned embodiment may be interpreted as a semiconductor chip on which such an image analysis program is installed so as to equip (a) the analysis function corresponding to the above analysis unit 67 and (b) the function of acquiring image data and analysis conditions corresponding to the above acquisition unit 66.

Alternatively, the second CPU 65 may be constituted as hardware (i.e. an image analysis device) in which the above acquisition unit 66 and the analysis unit 67 are included.

[2] In the aforementioned embodiment, an example in which a pulse sequence of the FE method is used in the main scan and concentration of contrast medium C(t) is calculated on the basis of the equation (1) as a model of MR signal intensity of the FE method has been explained. However, embodiments of the present invention are not limited to such an aspect. MR signal intensity may be logically defined in other pulse sequences such as a Spin Echo method and concentration of contrast medium C(t) may be calculated on the basis of the defined MR signal intensity.

[3] In the above embodiment, an example in which the second CPU 65 (image analysis device) is disposed inside the MRI apparatus 10 and blood flow volume is calculated and displayed in the MRI apparatus 10 has been explained. However, embodiments of the present invention are not limited to such an aspect. For example, the second CPU 65 (image analysis device) may be installed in a server of a picture archiving and communication systems (PACS) to which an MRI apparatus is connected as one of the modalities. In this case, for example, the server obtains image data and so on from the MRI apparatus, and the server displays the perfusion map by calculating concentration of contrast medium C(t) in the aforementioned manner.

[4] As an example of a region including air, an example in which the RF coil device 100 for the chest part is loaded and the local blood flow volume (per predetermined volume including air) is calculated for the imaging region including a lung has been explained. However, embodiments of the present invention are not limited to such an aspect. The same effects as the above embodiments can be obtained in imaging of other regions including air such as the stomach and intestines.

[5] In the flow of the above embodiment, an example in which the time variation of concentration of contrast medium C(t) of the artery region is calculated in Step S6 and then the time variation of concentration of contrast medium C(t) of the tissue region is calculated in Step S7 has been explained. However, embodiments of the present invention are not limited to such an aspect. The processing of Step S7 may be performed prior to the processing of Step S6. Alternatively, the processing of Step S6 and the processing of Step S7 may be performed in parallel (concurrently) by disposing a plurality of arithmetic devices in the analysis unit 67.

[6] In the above embodiment, an example in which concentration of contrast medium is calculated with correction of intensity of MR signals of a plurality of time-series images after injection of contrast medium has been explained. However, embodiments of the present invention are not limited to such an aspect. For example, C(t) may be calculated as blood flow volume under the equation (18) by using $T_1(t)$ and $T_2^*$ obtained from images acquired by a non-contrast imaging method such as changing BBTI (Black Blood Traveling Time corresponding to traveling time of blood inflowing into the imaging region).

[7] Correspondences between terms used in the claims and terms used in the embodiment described above will be described. Note that the correspondences described below are just some of possible interpretations for reference and should not be construed as limiting the present invention.

The coefficient "m" in the equations (2) and (14) is an example of "a coefficient that becomes smaller with larger rate of air region in the object" described in the claim.

[8] While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image analysis device comprising:
   memory circuitry configured to store an image analysis program; and
   processing circuitry configured, by executing the image analysis program, to:
      acquire image data of a plurality of images of an imaging region of an object respectively imaged by magnetic resonance imaging before and after administration of contrast medium,
   obtain a difference between a relaxation rate before administration of contrast medium and a relaxation rate after administration of contrast medium, which is an inverse value of a longitudinal relaxation time, and
      obtain a product of the difference and a coefficient proportional to tissue density of the object, and
      calculate an estimated value of concentration of contrast medium per unit volume including air region after administration of constant medium by using the product,
   wherein the processing circuitry is further configured to calculate the estimated value of concentration of contrast medium according to a multiplication value calculated by multiplying a coefficient proportional to tissue density of the object based on a pixel value of the image data before administration of contrast medium by the difference between relaxation rate before administration of contrast medium and relaxation rate after administration of contrast medium.

2. The image analysis device according to claim 1, wherein the processing circuitry is further configured to calculate bloodstream information based on information on time variation of concentration of contrast medium in a tissue region.

3. The image analysis device according to claim 1, wherein the processing circuitry is further configured to calculate bloodstream information based on information on time variation of concentration of contrast medium in an artery region.

4. The image analysis device according to claim 1, wherein the processing circuitry is further configured to calculate the estimated value of concentration of contrast medium so as to become proportional to both of (a) a difference between longitudinal relaxation time before administration of contrast medium and longitudinal relaxation time after administration of contrast medium and (b) a coefficient that becomes smaller with larger rate of air region in the object, based on a value related to longitudinal relaxation time before administration of contrast medium and each pixel value of the image data of a plurality of images before and after administration of contrast medium.

5. The image analysis device according to claim 4, wherein the processing circuitry is further configured to calculate the estimated value of concentration of contrast medium so as to become proportional to concentration of contrast medium, by calculating subtraction between a value proportional to a pixel value of an image after administration of contrast medium and a value proportional to a pixel value of an image before administration of contrast medium.

6. The image analysis device according to claim 4, wherein the processing circuitry is further configured to calculate the estimated value of concentration of contrast medium, according to a multiplication value calculated by multiplying a coefficient based on a pixel value of the image data before administration of contrast medium by a difference between relaxation rate before administration of contrast medium and relaxation rate after administration of contrast medium.

7. The image analysis device according to claim 4, wherein the processing circuitry is further configured to acquire an $R_1$ value indicative of relaxation rate or a multiplicative inverse of the $R_1$ value, as a value related to relaxation rate.

8. The image analysis device according to claim 7, wherein the processing circuitry is further configured to acquire (a) the image data of a plurality of images of a same imaging region time-sequentially imaged after administration of contrast medium and (b) image data of an image of the same imaging region imaged before administration of contrast medium; and
the processing circuitry is further configured to calculate time variation of the estimated value of concentration of contrast medium, based on the image data of a plurality of images of the same imaging region time-sequentially imaged and the image data of an image of the same imaging region imaged before administration of contrast medium.

9. The image analysis device according to claim 8, wherein the processing circuitry is further configured to acquire an artery region selected as a part of the same imaging region; and
the processing circuitry is further configured to uniformly calculate time variation of the estimated value of concentration of contrast medium for the artery region, to respectively calculate time variation of the estimated value of concentration of contrast medium for all of pixels, and to generate a perfusion map indicative of bloodstream amount at each pixel based on (a) time variation of the estimated value of concentration of contrast medium in the artery region and (b) time variation of the estimated value of concentration of contrast medium in each pixel.

10. The image analysis device according to claim 1,
wherein the processing circuitry is further configured to acquire a value related to longitudinal relaxation time before administration of contrast medium and a value related to longitudinal relaxation time after administration of contrast medium; and the processing circuitry is further configured to calculate the estimated value of concentration of contrast medium at each pixel position so as to become proportional to a product of a pixel value and a difference between values related to longitudinal relaxation time before and after administration of contrast medium, based on (a) each pixel value of the image data of a plurality of images and (b) the values related to longitudinal relaxation time before and after administration of contrast medium.

11. The image analysis device according to claim 10,
wherein the processing circuitry is further configured to acquire an $R_1$ value indicative of relaxation rate as the value related to longitudinal relaxation time.

12. The image analysis device according to claim 11,
wherein the processing circuitry is further configured to acquire (a) the image data of a plurality of images of a same imaging region time-sequentially imaged after administration of contrast medium and (b) image data of an image of the same imaging region imaged before administration of contrast medium; and the processing circuitry is further configured to calculate time variation of the estimated value of concentration of contrast medium, based on the image data of a plurality of images of the same imaging region time-sequentially imaged and the image data of an image of the same imaging region imaged before administration of contrast medium.

13. The image analysis device according to claim 12,
wherein the processing circuitry is further configured to acquire an artery region selected as a part of the same imaging region; and the processing circuitry is further configured to uniformly calculate time variation of the estimated value of concentration of contrast medium for the artery region, to respectively calculate time variation of the estimated value of concentration of contrast medium for all of pixels, and to generate a perfusion map indicative of bloodstream amount at each pixel based on (a) time variation of the estimated value of concentration of contrast medium in the artery region and (b) time variation of the estimated value of concentration of contrast medium in each pixel.

14. The image analysis device according to claim 1,
wherein the processing circuitry is further configured to acquire repetition time and flip angle as imaging conditions before and after administration of contrast medium; and the processing circuitry is further configured to calculate the estimated value of concentration of contrast medium based on the repetition time and the flip angle.

15. The image analysis device according to claim 1,
wherein the processing circuitry is further configured to acquire (a) the image data of a plurality of images of a same imaging region time-sequentially imaged after administration of contrast medium and (b) image data of an image of the same imaging region imaged before administration of contrast medium; and the processing circuitry is further configured to calculate time variation of the estimated value of concentration of contrast medium, based on the image data of a plurality of images of the same imaging region time-sequentially imaged and the image data of an image of the same imaging region imaged before administration of contrast medium.

16. The image analysis device according to claim 15,
wherein the processing circuitry is further configured to acquire an artery region selected as a part of the same imaging region; and the processing circuitry is further configured to uniformly calculate time variation of the estimated value of concentration of contrast medium for the artery region, to respectively calculate time variation of the estimated value of concentration of contrast medium for all of pixels, and to generate a perfusion map indicative of bloodstream amount at each pixel based on (a) time variation of the estimated value of concentration of contrast medium in the artery region and (b) time variation of the estimated value of concentration of contrast medium in each pixel.

17. The image analysis device according to claim 1,
wherein the processing circuitry is further configured to acquire the image data of a plurality of images including a pulmonary region of the object.

18. A control method of an image analysis device comprising:

controlling the image analysis device to acquire image data of a plurality of images of an imaging region of an object imaged by magnetic resonance imaging before and after administration of contrast medium;

controlling the image analysis device to obtain a difference between a relaxation rate before administration of contrast medium and a relaxation rate after administration of contrast medium, which is an inverse value of a longitudinal relaxation time, and controlling the image analysis device to obtain a product of the difference and a coefficient proportional to tissue density of the object, and controlling the image analysis device to calculate an estimated value of concentration of contrast medium per unit volume including air region after administration of contrast medium by using the product, wherein the calculating the estimated value of concentration of contrast medium is performed by utilizing a multiplication value calculated by multiplying a coefficient proportional to tissue density of the object based on a pixel value of the image data before administration of contrast medium by the difference between relaxation rate before administration of contrast medium and relaxation rate after administration of contrast medium.

* * * * *